US011394756B2

(12) United States Patent
Chuttani et al.

(10) Patent No.: US 11,394,756 B2
(45) Date of Patent: Jul. 19, 2022

(54) SYSTEMS AND METHODS FOR IMPROVED TRANSITIONS CONTINUITY BETWEEN WIRELESS PROTOCOLS

(71) Applicant: APPLE INC., Cupertino, CA (US)

(72) Inventors: Harshit Chuttani, Fremont, CA (US); Someet Lal, Fremont, CA (US); Kwangho Byun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 791 days.

(21) Appl. No.: 14/501,706

(22) Filed: Sep. 30, 2014

(65) Prior Publication Data

US 2016/0095151 A1 Mar. 31, 2016

(51) Int. Cl.
| | |
|---|---|
| *H04W 4/00* | (2018.01) |
| *H04W 80/00* | (2009.01) |
| *H04W 4/80* | (2018.01) |
| *H04W 72/04* | (2009.01) |
| *H04W 84/12* | (2009.01) |
| *H04W 60/00* | (2009.01) |
| *H04L 12/16* | (2006.01) |
| *H04L 65/40* | (2022.01) |
| *H04W 76/16* | (2018.01) |
| *H04L 65/1016* | (2022.01) |
| *H04W 76/36* | (2018.01) |
| *H04W 88/06* | (2009.01) |

(52) U.S. Cl.
CPC ......... *H04L 65/40* (2013.01); *H04L 65/1016* (2013.01); *H04W 76/16* (2018.02); *H04W 76/36* (2018.02); *H04W 88/06* (2013.01)

(58) Field of Classification Search
CPC ............ H04W 76/064; H04W 76/027; H04W 60/005; H04W 76/16; H04W 76/36; H04L 69/32; H04L 65/1016; H04L 2209/80
USPC .................................................. 370/331, 329
See application file for complete search history.

(56) References Cited

U.S. PATENT DOCUMENTS

| | | | | |
|---|---|---|---|---|
| 2002/0042264 A1* | 4/2002 | Kim | ................... | H04N 1/00307 455/414.1 |
| 2002/0111169 A1* | 8/2002 | Vanghi | ................... | H04W 76/15 455/439 |
| 2008/0240058 A1* | 10/2008 | Hansen | ................. | H04W 92/18 370/338 |

(Continued)

*Primary Examiner* — Khaled M Kassim
*Assistant Examiner* — Jason A Harley
(74) *Attorney, Agent, or Firm* — Fay Kaplun & Marcin, LLP (57) ABSTRACT

Described herein are systems and methods for improved transitions continuity between wireless protocol states. One embodiment relates to a method including, at a user equipment ("UE"), establishing a connection to a first wireless network in accordance with a first wireless communication protocol, wherein the first wireless communication protocol is used for voice communications and data communications between the UE and the first wireless network, receiving a user request to disable the voice communications with the first wireless network, registering for voice communications with a second wireless network in accordance with a second wireless communication protocol, and maintaining the connection to the first wireless network to continue data communications between the UE and the first wireless network, wherein the UE simultaneously operates in the first wireless communication protocol and the second wireless communication protocol.

18 Claims, 6 Drawing Sheets

(56) References Cited

U.S. PATENT DOCUMENTS

| | | | |
|---|---|---|---|
| 2008/0250466 A1* | 10/2008 | Ke | H04N 21/4788 725/109 |
| 2008/0250468 A1* | 10/2008 | Sullivan | H04N 7/165 725/115 |
| 2012/0236709 A1* | 9/2012 | Ramachandran | H04W 76/18 370/221 |
| 2013/0266004 A1* | 10/2013 | Nunez Sanz | H04L 65/103 370/354 |
| 2016/0050618 A1* | 2/2016 | Kollu | H04W 48/18 455/418 |

* cited by examiner

SYSTEMS AND METHODS FOR IMPROVED TRANSITIONS CONTINUITY BETWEEN WIRELESS PROTOCOLS

BACKGROUND

Long-Term Evolution ("LTE") is a standard for wireless communication of high-speed data for mobile phones and data terminals. The LTE standard has been developed by the 3rd Generation Partnership Project ("3GPP") and is described as a natural upgrade path for carriers using prior generation networks or "legacy" protocols, such as Global System for Mobile Communications/Universal Mobile Telecommunications System ("GSM/UMTS") protocols and Code Division Multiple Access ("CDMA") 2000 1× (e.g., 1×RTT or simply "1×") wireless communication protocols. Through the use of new digital signal processing ("DSP") techniques and modulations, LTE has increased the capacity and speed of wireless data networks.

Through the usage of an all-Internet Protocol ("IP") network, the LTE standard supports only packet switching ("PS") data transmissions. Similar to many other protocols, an IP network breaks data into blocks and wraps the blocks into structures called packets. Each packet contains, along with the data load, information about the IP address of the source and the destination nodes, sequence numbers, control information, etc. In a circuit switched ("CS") network, the communication channel remains open and in use throughout the duration of the call and the call data is transmitted all at once without being broken into blocks.

Since voice calls in GSM, UMTS and CDMA2000 utilize circuit switched data transmissions, carriers adopting the LTE standard need to re-engineer their voice call network. Various approaches include Voice over LTE ("VoLTE"), circuit-switched fallback ("CSFB"), and simultaneous voice and LTE ("SVLTE"). For instance, the VoLTE approach uses an IP multimedia subsystem ("IMS") network having specific profiles for control and media planes of voice service on LTE. Accordingly, VoLTE communications result in the voice service being delivered as data flows within the LTE data bearer. Thus, there is no requirement for the legacy circuit-switched voice network to be maintained. Furthermore, VoLTE communications has up to three times more voice and data capacity than UMTS networks and up to six times more than GSM networks. Using the CSFB approach, LTE provides data services while a received or initiated voice call falls back to the circuit-switched network. Under the SVLTE approach, the user equipment ("UE") works simultaneously in both the LTE and circuit switched modes, wherein the LTE mode provides data services and the circuit switched mode provides the voice service.

SUMMARY

Described herein are systems and methods for improved transitions continuity between wireless protocol states. One embodiment relates to a method including, at a UE, establishing a connection to a first wireless network in accordance with a first wireless communication protocol, wherein the first wireless communication protocol is used for voice communications and data communications between the UE and the first wireless network, receiving a user request to disable the voice communications with the first wireless network, registering for voice communications with a second wireless network in accordance with a second wireless communication protocol, and maintaining the connection to the first wireless network to continue data communications between the UE and the first wireless network, wherein the UE simultaneously operates in the first wireless communication protocol and the second wireless communication protocol.

A further embodiment relates to a UE, comprising a processor configured to control establishing and releasing connections between the wireless communication device and a first wireless network and between the wireless communication device and a second wireless network, a transceiver configurable to transmit and receive signals to the first wireless network according to a first wireless communication protocol and to the second wireless network according to a second wireless communication protocol, and a non-transitory memory having a program stored thereon. The execution of the program causes the processor to perform operations comprising establishing a connection to a first wireless network in accordance with a first wireless communication protocol, wherein the first wireless communication protocol is used for voice communications and data communications between the UE and the first wireless network, receiving a user request to disable the voice communications with the first wireless network, registering for voice communications with a second wireless network in accordance with a second wireless communication protocol, and maintaining the connection to the first wireless network to continue data communications between the UE and the first wireless network, wherein the UE simultaneously operates in the first wireless communication protocol and the second wireless communication protocol.

A further embodiment relates to a computer program product encoded as computer program code in a non-transitory computer readable medium for configuring wireless circuitry of a wireless communication device, the computer program product comprising instructions for establishing a connection to a first wireless network in accordance with a first wireless communication protocol, wherein the first wireless communication protocol is used for voice communications and data communications between the UE and the first wireless network, receiving a user request to disable the voice communications with the first wireless network, registering for voice communications with a second wireless network in accordance with a second wireless communication protocol, and maintaining the connection to the first wireless network to continue data communications between the UE and the first wireless network, wherein the UE simultaneously operates in the first wireless communication protocol and the second wireless communication protocol.

DETAILED DESCRIPTION

The exemplary embodiments may be further understood with reference to the following description and the appended drawings, wherein like elements are referred to with the same reference numerals. The exemplary embodiments show systems and methods for improved transitions continuity between wireless protocol states. For instance, exemplary embodiments described herein may allow for faster transition with session continuity between VoLTE-based service and SRLTE-based service at a mobile device such as a UE. As will be described in greater detail below, the exemplary embodiments allow for the UE to reduce radio transmission time and conserve battery life by eliminating voice/data timeouts while maintaining session continuity.

As noted above, VoLTE communications has provided a way for transmitting simultaneous voice and data traffic over LTE technology. However, at times when the UE travels beyond the LTE coverage, the UE is typically redirected to the underlying 3G network for sending and receiving data traffic. For instance, voice traffic may be handled in two manners, namely the packet-switched based approach, wherein the 3G network may connect to a IMS framework, and the circuit-switched based approach, such as Single Radio Voice Call Continuity ("SRVCC") handovers or timer-based transitions.

Conventional methods for transitioning between VoLTE and 1×SRLTE states have room for reduction of signaling, which directly impacts the radio transmission time and battery usage. Furthermore, there is also room for optimization in the voice/data timeout that a user would experience during the transition between the protocol states. One skilled in the art would understand that uninterrupted voice and data availability is a very important aspect for an improved user experience. However, the current methods change IP addresses following a transition between the protocol states, and thus leads to breaking session continuity and a degraded user experience.

Figure 1:
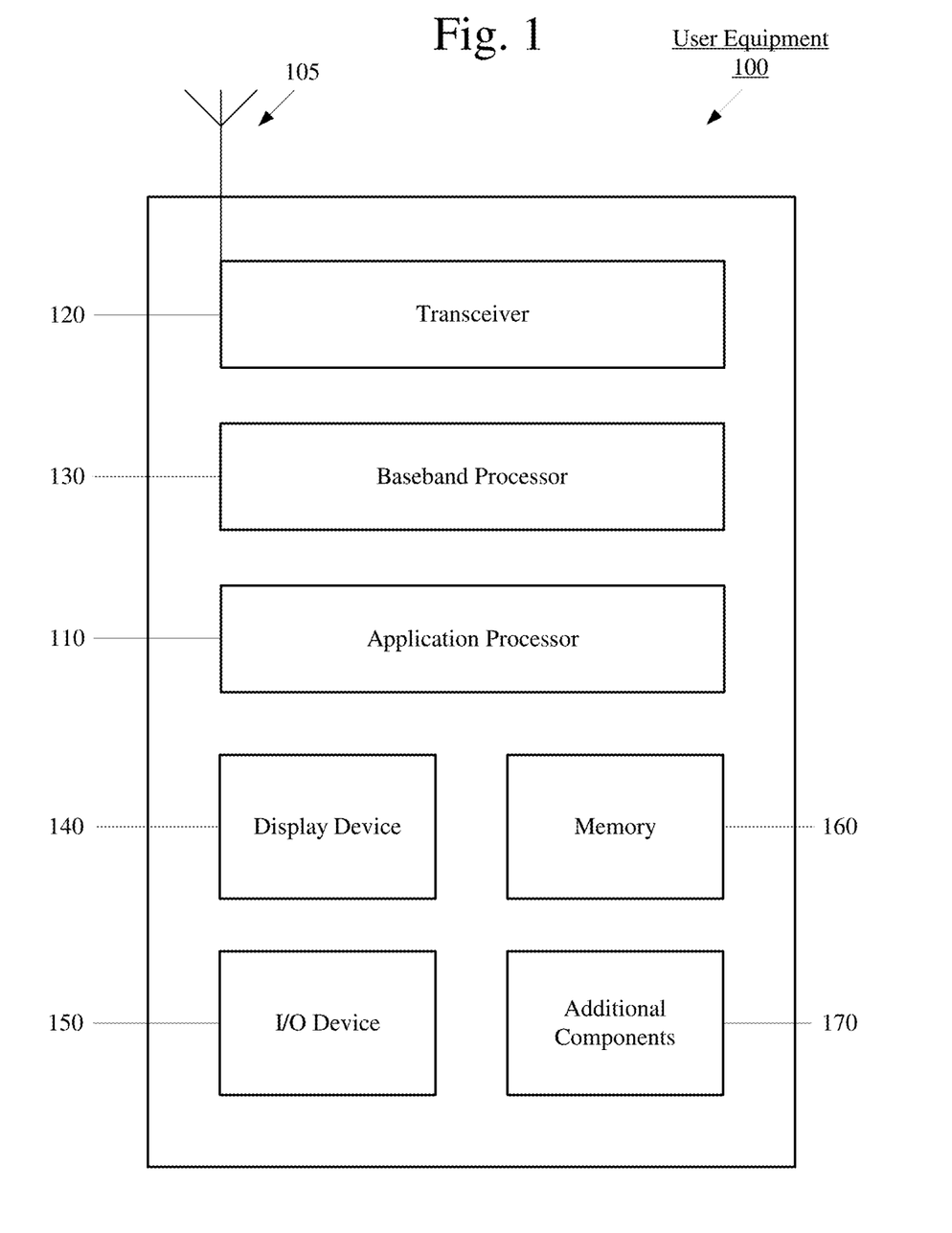
FIG. 1 shows an exemplary user equipment (UE) for improved system information reading procedure during cell selection and reselection according to an embodiment described herein.

FIG. 1 shows an exemplary UE 100 for improved system information reading procedure during cell selection and reselection according to an embodiment described herein. The UE 100 may represent any electronic device that is configured to perform wireless functionalities. For example, the UE 100 may be a portable device such as a phone, a smartphone, a tablet, a phablet, a laptop, etc. In another example, the UE 100 may be a stationary device such as a desktop terminal. The UE 100 may be a VoLTE-capable SRLTE device for communicating with a mobile switching center. The UE 100 may include an antenna 105 connected to a transceiver 120, which is connected to a baseband processor 130, which is further connected to an applications processor 110. The UE 100 may further include a display 140, an I/O device 150, a memory arrangement 160 that are accessible by the baseband processor 130 or the applications processor 110. Those skilled in the art will understand that the UE 100 may also include additional components 170, for example, a Bluetooth/WiFi transceiver, further input devices (e.g., a keypad, a touchscreen, etc.), a battery, etc.

The transceiver 120 and the baseband processor 130 may be used to perform operations such as, but not limited to, scanning the network for specific radio frequency bands, exchanging information with one or more mobile switching centers, etc. It should be noted that the exemplary embodiments are described as being performed by the transceiver 120 and the baseband processor 130. However, either of these components may perform the described functionalities without the other component. In addition, other components (e.g., the application processor 110) may also perform some or all of the functionalities described herein. The application processor 110, the transceiver 120 and the baseband processor 130 may be, for example, general purpose processors, an application specific integrated circuit (ASIC), another type of integrated circuit and these processors may execute software programs or firmware.

For transitioning between a VoTLE enabled state and a VoLTE disabled state, one possible approach would allow for the user of the UE 100 to initiate the switching of protocol states. Specifically, the user may direct a transition from a VoLTE-enabled state to a VoLTE-disabled state within a SRLTE device. Accordingly, the transmission of voice data may then fallback from VoLTE to 1×-SRLTE.

Figure 2:
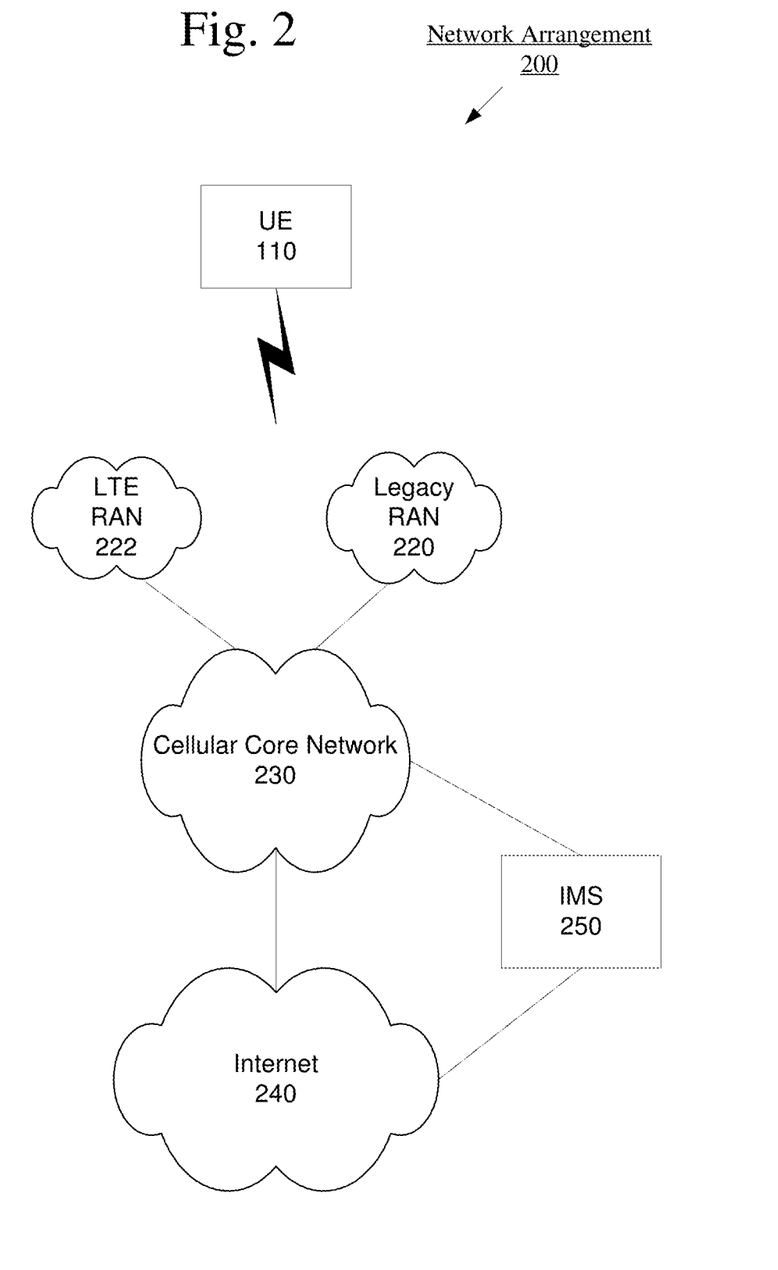
FIG. 2 shows an exemplary network arrangement.

FIG. 2 shows an exemplary network arrangement 200. The exemplary network arrangement 200 includes the UE 100 and may include additional UEs (not shown). As described above, the UE 100 may be configured to communicate directly with one or more networks. In this example, the networks with which the UE 100 may communicate are a legacy radio access network (RAN) 220 and a Long Term Evolution radio access network (LTE-RAN) network 222. However, it should be understood that the UE 100 may also communicate with other types of wired or wireless networks. In this example, it may be considered that the legacy RAN 220 is a CS-based network that may provide the 1×-SRLTE capability to the UE 100 and the LTE-RAN 222 provides the VoLTE capability to the UE 100.

The legacy RAN 120 and the LTE-RAN 122 may be portions of cellular networks that may be deployed by cellular providers (e.g., Verizon, AT&T, Sprint, T-Mobile, etc.). These networks 220 and 222 may include, for example, base stations (Node Bs, eNodeBs, HeNBs, etc.) that are configured to send and receive traffic from client stations that are equipped with the appropriate cellular chip set. Examples of the legacy RAN may include those networks that are generally labeled as second generation ("2G") and/or third generation ("3G") networks and may include circuit switched voice calls and packet switched data operations. Those skilled in the art will understand that the cellular providers may also deploy other types of networks, including further evolutions of the cellular standards, within their cellular networks.

In addition to the networks 220 and 222, the network arrangement 200 also includes a cellular core network 230 and the Internet 240. The cellular core network 230, the legacy RAN 220 and the LTE-RAN 222 may be considered a cellular network that is associated with a particular cellular provider (e.g., Verizon, AT&T, Sprint, T-Mobile, etc.). The cellular core network 230 may be considered to be the interconnected set of components that manages the operation and traffic of the cellular network. The interconnected components of the cellular core network 230 may include any number of components such as servers, switches, routers, etc. The cellular core network 230 also manages the traffic that flows between the cellular network and the Internet 240.

The network arrangement 200 also includes an IP Multimedia Subsystem (IMS) 250. The IMS 250 may be generally described as an architecture for delivering multimedia services to the UE 100 using the IP protocol. The IMS 250 may include a variety of components to accomplish this task. For example, a typical IMS 250 includes a Home Subscriber (HS) server that stores subscription information for a user of the UE 100. This subscription information is used to provide the correct multimedia services to the user. The IMS 250 may communicate with the cellular core network 230 and the Internet 240 to provide the multimedia services to the UE 100. The IMS 250 is shown in close proximity to the cellular core network 230 because the cellular provider typically implements the functionality of the IMS 250. However, it is not necessary for this to be the case. The IMS 250 may be provided by another party.

Thus, the network arrangement 200 allows the UE 100 to perform functionalities generally associated with computer and cellular networks. For example, the UE 100 may perform voice calls to other parties, may browse the Internet 140 for information, may stream multimedia data to the UE 100, etc. As described above, the general functionality of the UE 100 that may be implemented by the network arrangement 200 in the exemplary embodiments is the ability of the UE to switch between the legacy RAN 220 and the LTE-RAN 222 for voice calls.

While in the deregistered state, the UE 100 may proceed to switch its internal configuration (e.g., LTE protocol stacks) for 1×-SRLTE mode. Once the stack of the UE 100 is ready for 1×-SRLTE operation, the UE 100 may then register for 1× voice data with the legacy RAN 220. After registering, the UE 100 may perform an initial attach on LTE with CS as the preferred voice domain. The UE 100 then receives a packet data network ("PDN") for the internet bearer, and thus the UE 100 may now have both CS-based service and PS-based service available.

Figure 3:
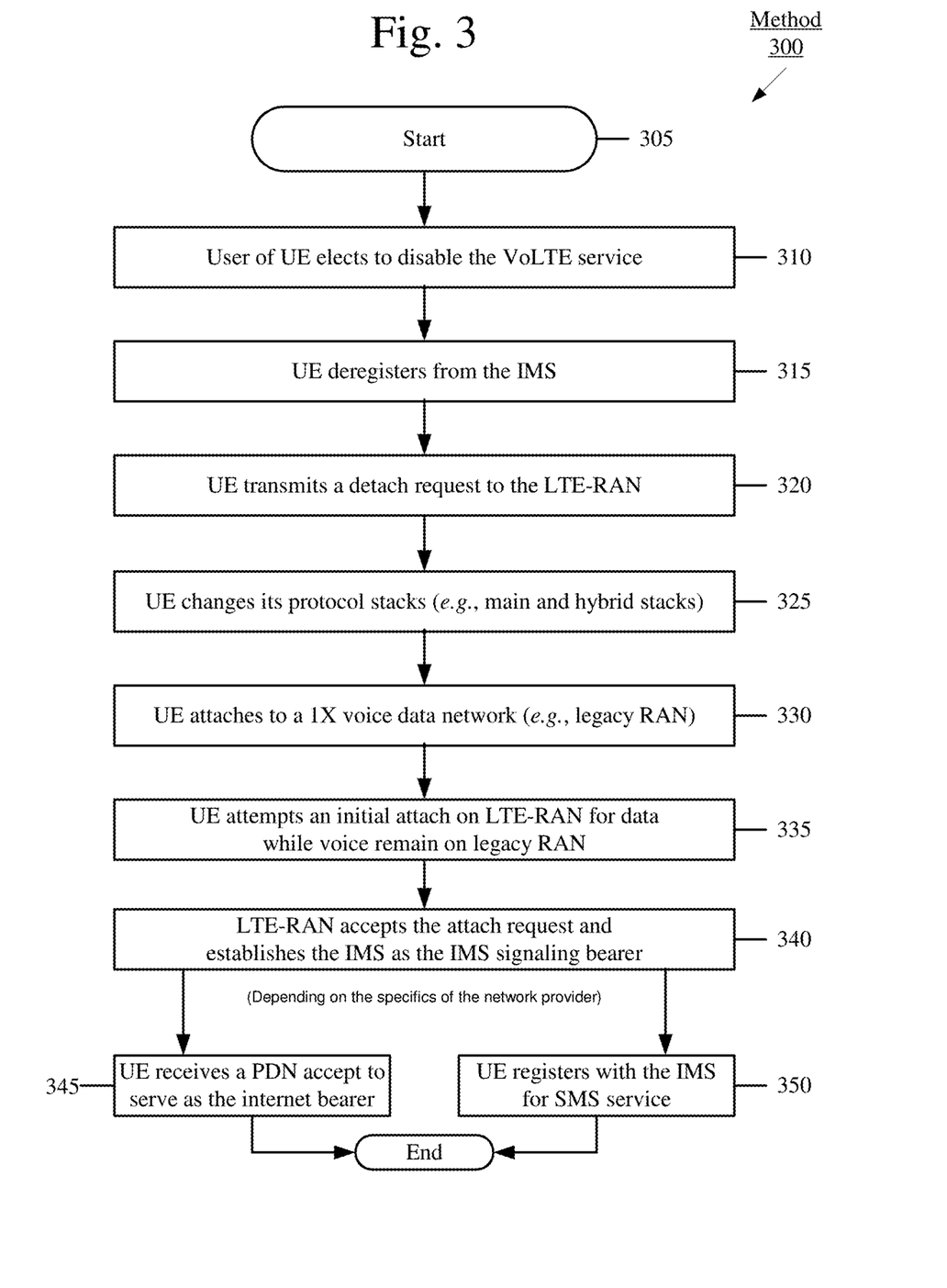
FIG. 3 shows an exemplary method for the user to initiate the operation of the exemplary UE from a VoLTE state to a SRLTE state.

FIG. 3 shows an exemplary method 300 for the user to initiate the operation of the exemplary UE 100 from a VoLTE state to a SRLTE state and clearing device registration. The method 300 will be described with reference to the exemplary UE 100 and the exemplary network arrangement 200. At the start 305, the UE 100 may be VoLTE enabled (e.g., attached to the LTE-RAN 222) and registered with the IMS 250. Accordingly, the UE 100 may feature PS connectivity for both voice and data operations via the LTE-RAN 222. In step 310, the user of the UE 100 may elect to disable the VoLTE service. There may be a variety of reasons why a user would elect to disable the VoLTE service, including, for example, quality, latency, etc.

In step 315, the UE 100 may be deregistered from the IMS 250. Furthermore, the radio access technology ("RAT") registration of the UE 100 may be cleared, e.g., the registration with the LTE-RAN 222 may be cleared. Following the clearing of the registration, in step 320 the UE 100 may transmit a detach request to the LTE-RAN 222.

In step 325, while detached from the LTE-RAN 222, the UE 100 may change its protocol stacks (e.g., main and hybrid stacks). Specifically, at the start of the method 300, such as at step 305, the main stack is the stack used to implement VoLTE and the hybrid or secondary stack is for non-LTE operation, such as a stack for a CS fallback. However, in step 325, the UE 100 may switch the main stack and hybrid stack for operating in SRLTE. For example, the main stack of the UE 100 may be configured for CDMA communications and a secondary stack of the UE 100 may be configured for LTE communications. In step 330, the UE 100 may attach to a 1× voice data network, such as a CDMA protocol network (e.g., legacy RAN 220).

In step 335, the UE 100 may attempt an initial attach on the LTE-RAN 222 for data transmission while the voice transmissions remain in the CS domain of the legacy RAN 220 (e.g., CDMA is the preferred voice domain). In step 340, the LTE-RAN 222 may accept the initial attach request and establish the IMS 250 as the IMS signaling bearer. Furthermore, depending on the specifics of the network provider, the method 300 may advance to either step 345 or step 350.

In step 345, the UE 100 may receive a PDN accept to serve as the internet bearer. In step 350, the UE 100 may register with the IMS 250 for short message services ("SMS"). As described above, the step 350 is carried out for those network providers that provide SMS over the LTE-RAN 222 rather than the legacy RAN 220 (e.g., CS network). If the network provider provides SMS via the legacy RAN 220, then step 350 would not be performed. Accordingly, the UE 100 may now have both CS-based service via the legacy RAN 220 (e.g., for voice) and PS-based service connectivity via the LTE-RAN 222 (e.g., for data).

However, it is important to note that during the method 300, the UE 100 does not maintain session continuity. Specifically, since the UE 100 deregisters from the IMS 250 and subsequently re-registers, the IP address of the UE 100 changes. Thus, if a user of the UE 100 were in the middle of a data session or transaction (e.g., streaming a video file, downloading a file, etc.), the data session or transaction would be halted because of the deregistration and loss of the IP address.

Furthermore, the process of detaching and attaching the UE 100 from the LTE-RAN 222 increases communication delays. These communication delays may be longer than CS/PS timeouts. For instance, an exemplary detach procedure may take approximately 250-500 ms ($T_{Detach}$). The attach procedure may necessitate approximately 800-1000 ms ($T_{Attach}$). This may only provide the IMS bearer. The establishment of the Internet bearer may require an additional 1000-1500 ms ($T_{Internet}$). Table 1 shows exemplary time approximations for each step of method 300.

TABLE 1

| Method 300 | |
| --- | --- |
| $T_{Detach}$ | 200-500 ms |
| $T_{Stack\_Switch}$ | 1100-1200 ms |
| $T_{Attach}$ | 800-1000 ms |
| $T_{Internet}$ | 1000-1500 ms |

Accordingly, the implicit total cost of the detach and reattach procedures may be up to 3 seconds. Thus, an improved method for allowing voice transmission to fallback from VoLTE to SRTLE may be advantageous.

Figure 4:
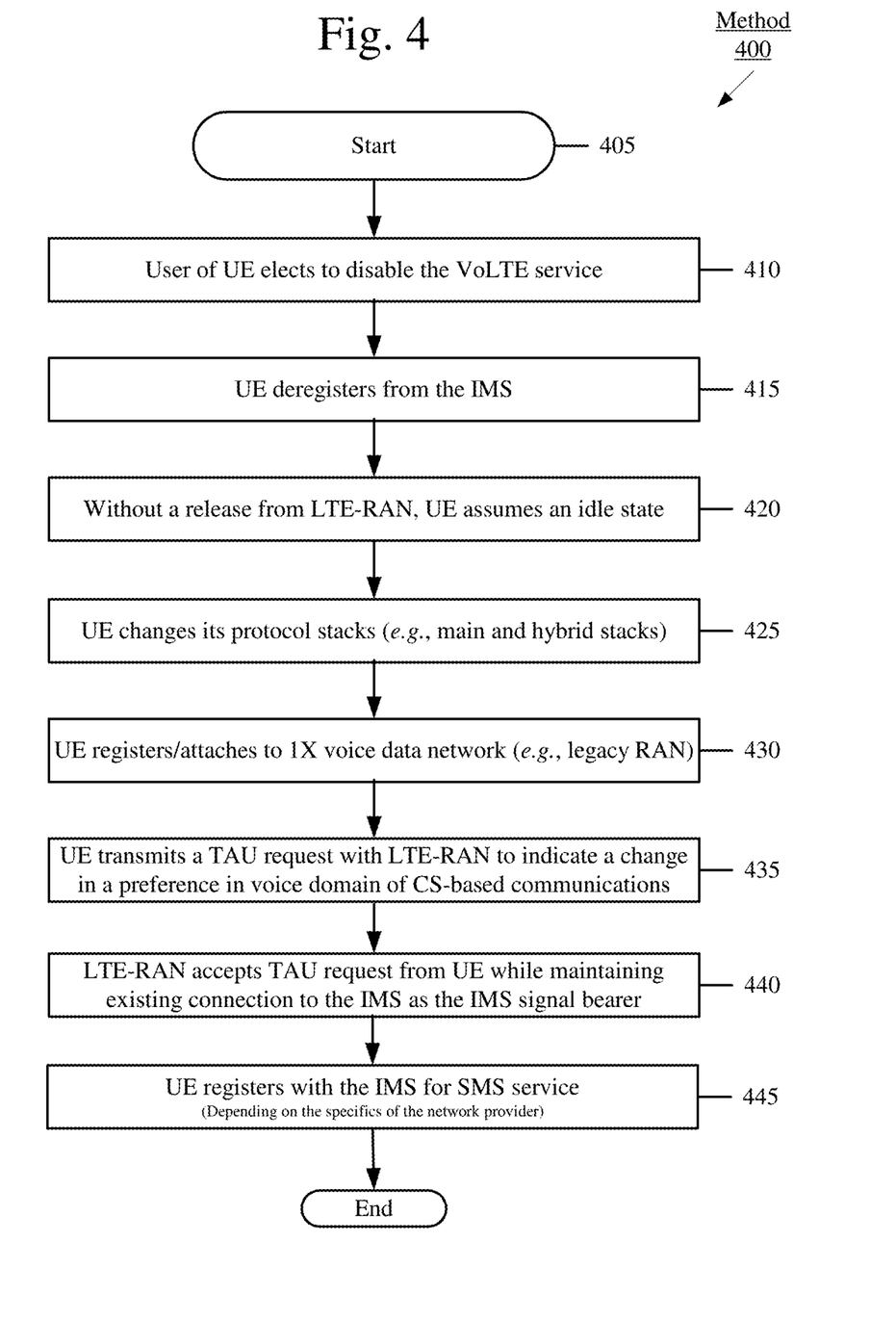
FIG. 4 shows an exemplary method for improved transitions with session continuity between wireless protocols according to an embodiment described herein.

FIG. 4 shows an exemplary method 400 for improved transitions with session continuity between wireless protocols according to an exemplary embodiment described herein. For instance, method 400 may be applied to the UE 100 transitioning from a VoLTE protocol to a SRLTE protocol. The method 400 will be described with reference to the exemplary UE 100 and the exemplary network arrangement 200. Similar to method 300, at the start 405, the UE 100 may be attached to the LTE-RAN 222 featuring PS connectivity and may be VoLTE enabled and registered with the IMS 250. In step 410, the user of the UE 100 may elect to disable the VoLTE service.

In step 415, the UE 100 may be deregistered from the IMS 250. However, in contrast to method 300, the LTE-RAN 222 registration of the UE 100 may not be cleared or released. Accordingly, without a release from the LTE-RAN 222, in step 420 the UE 100 may assume an idle state, e.g., a radio resource control ("RRC") inactive state or "RRC_IDLE" state. It should be noted that in step 415, it is the UE 100 itself that places the UE 100 into the idle state. In other operations not related to the currently described functionality, it may be that the network, e.g., the evolved Node B (eNB) or other network component of the LTE-RAN 222, provides the UE 100 with an instruction to enter the idle state.

Under the mask of an RRC_IDLE state, in step 425, the UE 100 may proceed to switch the internal stacks (e.g., main and hybrid stacks) for 1×-SRLTE mode in the same manner as described above in step 325. Once the internal stacks are ready for 1×-SRLTE operation, in step 430, the UE 100 may register and attach to 1× voice network, such as a CDMA protocol network (e.g., legacy RAN 220).

In step 435, the UE 100 may perform a tracking area update (TAU) request with the LTE-RAN 222 to indicate a change in a preference in voice domain of CS-based communications (e.g., transmit a service request for a preferred voice domain of CS voice only). Those skilled in the art will understand that a TAU request is a standard communication between UE 100 and LTE-RAN 222. Essentially, it is important that the LTE-RAN 222 be aware of the location of each of the UEs in the network. However, when a UE goes into an idle state, it is possible that the LTE-RAN 222 could lose track of the location of the UE. Thus, the UE notifies the LTE-RAN 222 of its current location by sending a TAU request when the UE moves between tracking areas when the UE is in an idle state. However, the UE is not limited to sending the TAU request to the LTE-RAN 222 only when it changes tracking areas. Thus, in the exemplary embodiments, the UE 100 may include logic that indicates the UE 100 should send a TAU request to the LTE-RAN 222 when it has been placed into the idle state based on the exemplary procedure described herein, the CS-based stack has become the primary stack and the UE 100 has attached to the 1× voice data network (e.g., legacy RAN 220). The UE 100 may send this TAU request even if the UE 100 has not changed tracking areas. In addition, the TAU request, in addition to the tracking information that is normally provided in a TAU request, may also include the change in the preference for the voice domain to be the CS-based legacy RAN 220.

In step 440, the LTE-RAN 222 may accept the TAU request from the UE 100 while maintaining the existing connection to the IMS 250 as the IMS signal bearer. Thus, the LTE-RAN 222 is now aware that the UE 100 prefers voice calls on the CS-based legacy RAN 220, rather than the LTE-RAN 222. Furthermore, as described in detail above, depending on the specifics of the network provider, the method 400 may advance to the step 445 wherein the UE 100 may register with the IMS 250 for short message services ("SMS").

Accordingly, the UE 100 may now assume normal operation in both LTE mode (e.g., PS-based service) and 1×-SRLTE mode (e.g., CS-based service connectivity). Furthermore, unlike the method 300, the UE 100 that implements the method 400 maintains session continuity. Specifically, since the IMS 250 and internet bearer have are already been configured with an unchanged IP address, UE 100 does not need to release its LTE-RAN 222 registration and subsequently re-register with the LTE-RAN 222. Thus, the IP address of the UE 100 does not change while transitioning from the VoLTE protocol to the SRLTE protocol for voice calls. In the example above, it was stated that the changing of the IP address for the UE 100 that is the result of the method 300 would cause a current data session or transaction (e.g., streaming a video file, downloading a file, etc.) to be halted. In contrast, the method 400 allows the current data session or transaction to continue because the IP address of the UE 100 remains the same.

As noted above in reference to method 300, the procedures for detaching and re-attaching the UE 100 to the LTE-RAN 222 introduces a delay of up to 3 seconds. With the exemplary method 400, the detach and reattach procedures are no longer required. Accordingly, the method 400 makes it feasible to replace these procedures with the TAU requests of step 435. The TAU requests may only require 175-500 ms of delay. Table 2 shows exemplary time approximations for each step of method 400.

TABLE 2

| Method 400 | |
|---|---|
| $T_{RRC\_Idle\_Mask}$ | Instantaneous (no signaling) |
| $T_{Stack\_Switch}$ | 1100-1200 ms |
| $T_{TAU}$ | 175-500 ms |

It should be noted that the time values depicted in both Table 1 and Table 2 are merely approximations used to illustrate the reduction in the expected delay between method 300 and method 400.

Figure 5:
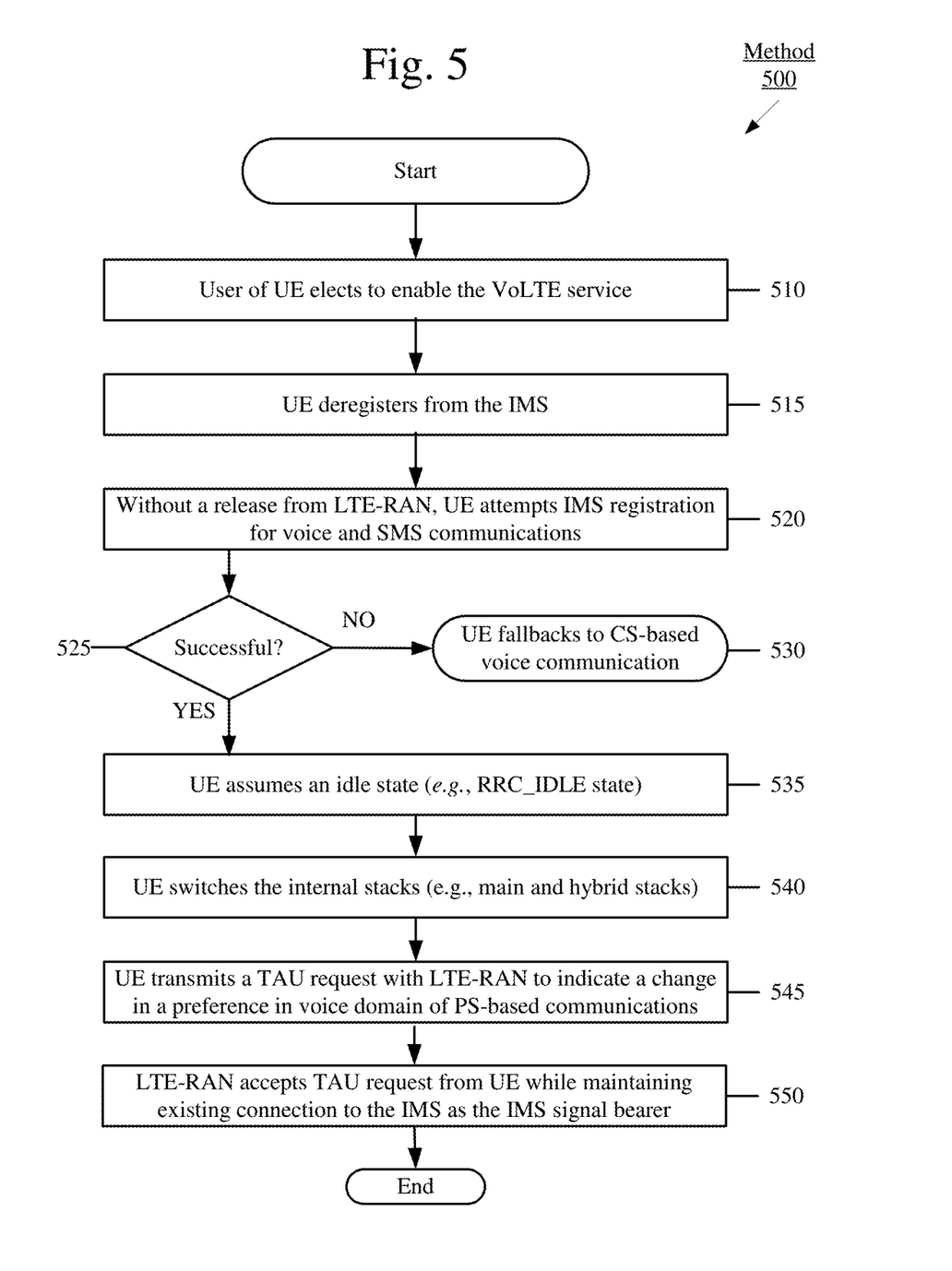
FIG. 5 shows an exemplary reverse method for improved transitions with session continuity between wireless protocols according to an embodiment described herein.

FIG. 5 shows an exemplary reverse method 500 for improved transitions with session continuity between wireless protocols according to an embodiment described herein. For instance, method 500 may be applied to the UE 100 transitioning from the SRLTE protocol back to the VoLTE protocol. The method 500 will also be described with reference to the exemplary UE 100 and the exemplary network arrangement 200. Therefore, at the start of the method 500, the UE 100 may be disabled for VoLTE communication.

In step 510, the user of the UE 100 may elect to enable the VoLTE service. In step 515, the UE 100 may be deregistered from the IMS 250. Similar to method 400, the LTE_RAN 222 registration of the UE 100 may not be cleared or released. Accordingly, without a release from the LTE-RAN 222, in step 520 the UE 100 may attempt IMS 250 registration for voice and SMS communications. In step 525, it may be determined if the IMS 250 registration was successful. If the IMS 250 registration is not successful, the UE 100 may fallback to CS-based voice communication (e.g., SRLTE on the legacy RAN 220) in step 530. If the IMS 250 registration is successful, the method 500 may advance to step 535.

In step 535, the UE 100 may assume an idle state, e.g., a radio resource control ("RRC") inactive state or "RRC_IDLE" state. Under the mask of an RRC_IDLE state, in step 540, the UE 100 may proceed to switch the internal stacks (e.g., main and hybrid stacks). Since this is the opposite operation from the method 400, the main stack will be switched to be the LTE stack for VoLTE operation and the hybrid or secondary stack will be the CS based stack. While having a CS based protocol on the secondary stack is a possibility, it is noted that the UE in VoLTE mode may have LTE on the main stack with no protocol on secondary stack. Accordingly, one embodiment may allow for the possibility of having nothing on the hybrid/secondary stack while VoLTE is enabled on the UE.

Once the internal stacks are ready for VoLTE operation, in step 545, the UE 100 may perform a TAU request with the LTE-RAN 222. Specifically, the TAU request may be sent to the LTE-RAN 222 to indicate a change in a preference in voice domain of PS-based communications (e.g., transmit a service request in VoLTE for a preferred voice domain of PS voice transmissions and CS voice as secondary).

In step 550, the LTE-RAN 222 may accept the TAU request from the UE 100 while maintaining existing connection to the IMS 250 as the IMS signaling bearer. Accordingly, the UE 100 may now assume normal operation in LTE mode (e.g., PS-based service) for both data communications and voice communications. Furthermore, similar to the method 400, the UE 100 in method 500 maintains session continuity. Specifically, since the IMS 250 and internet bearer have are already been configured with an unchanged IP address, UE 100 does not need to release it LTE-RAN 222 registration and subsequently re-register with the LTE-RAN 222. Thus, the IP address of the UE 100 does not change while transitioning from the SRLTE protocol to the VoLTE protocol.

Figure 6:
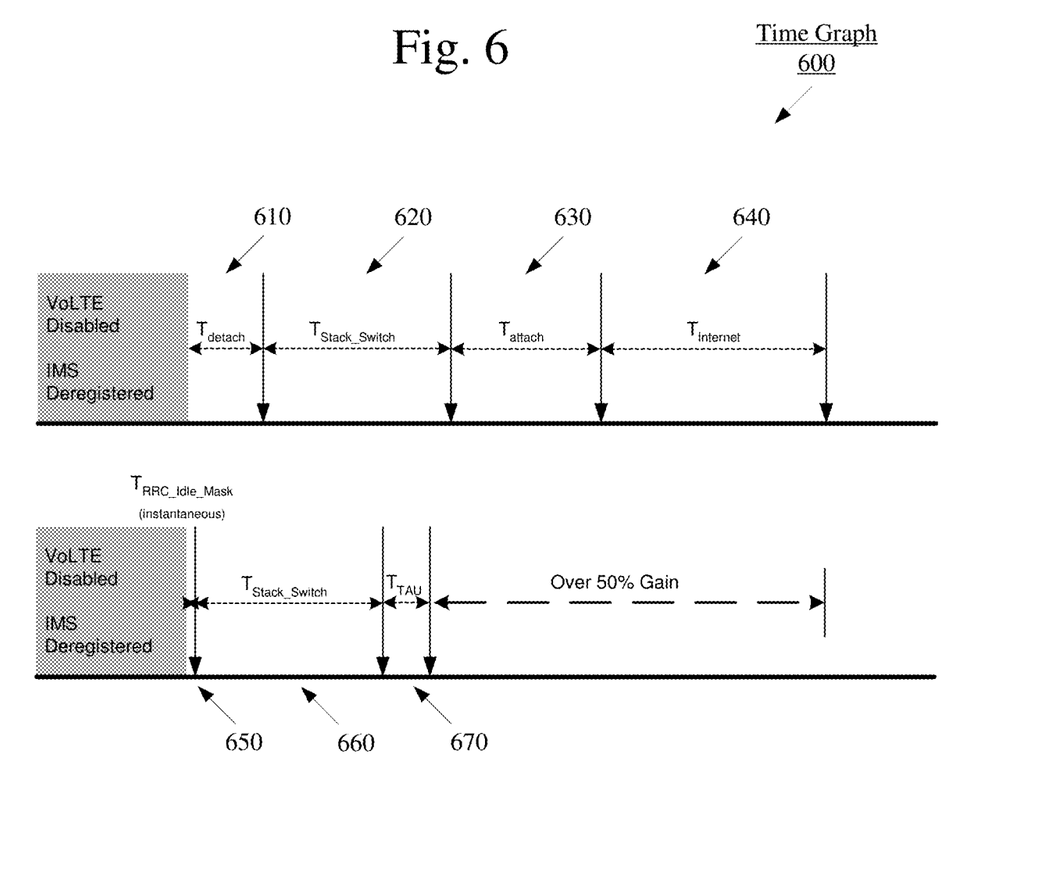
FIG. 6 shows an exemplary time graph depicting the reduction in time delay between the method of FIG. 3 and the method of FIG. 4.

FIG. 6 shows an exemplary time graph 600 depicting the reduction in time delay between the method 300 of FIG. 3 and the method 400 of FIG. 4. Following the disabling of the LTE-RAN 222 and de-registering with the IMS 250, the amount of delay created by method 400 includes the time components $T_{detach}$ 610, $T_{Stack\_Switch}$ 620, $T_{attach}$ 630, and $T_{internet}$ 640. For method 400, after the disabling of the LTE-RAN 222 and de-registering with the IMS 250, the amount of delay created by method 400 includes the time components $T_{RRC\_Idle\_Mask}$ 650 (instantaneous), $T_{Stack\_Switch}$ 660, and $T_{TAU}$ 670. As noted in the exemplary time graph 600, method 400 provides an approximate reduction of 50% in the time delay for transitioning between the VoLTE protocol communications and the SRLTE protocol communications.

The exemplary systems and methods described above may be implemented in any number of scenarios to improve the overall operations of the UE 100 when transitioning from one communication protocol to another. As detailed above, the exemplary operational improvements may include reducing and/or eliminating voice and data timeouts, maintaining sessions continuity and reducing radio transmission time. By utilizing the systems and methods described above, the UE may also reduce overall signaling throughout a service provider network. For instance, the exemplary systems and methods described above requires less signaling from the UE 100 to the network, and thus leads to lessening the load on the network. Further, the further the transmission procedures required by the UE 100 also reduces the power consumption of the battery of the UE 100.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   at a user equipment ("UE"):
   establishing a connection to a first wireless network in accordance with a first wireless communication protocol, wherein the first wireless communication protocol is used for voice communications and data communications between the UE and the first wireless network;
   receiving a user request to disable the voice communications with the first wireless network;
   transmitting, in response to the user request to disable the voice communications with the first wireless network, a request to deregister from an IP Multimedia Subsystem (IMS) before registering for voice communications with the second wireless network, wherein, as a result of the request to deregister, the UE switches an internal configuration and changes an IP address;
   registering for voice communications with a second wireless network in accordance with a second wireless communication protocol; and
   maintaining the connection to the first wireless network to continue data communications between the UE and the first wireless network, wherein the UE simultaneously operates in the first wireless communication protocol and the second wireless communication protocol.

2. The method of claim 1, further comprising:
   entering into an idle state; and
   reconfiguring a plurality of internal stacks of the UE while in the idle state, wherein the reconfiguring includes indicating a first internal stack related to the second wireless communication protocol is a primary stack and a second internal stack related to the first wireless communication protocol is a secondary stack.

3. The method of claim 1, wherein the first wireless communication protocol includes assigning an address to the UE and wherein the UE maintains the same address throughout the steps of the method.

4. The method of claim 3, wherein the address is an Internet Protocol (IP) address.

5. The method of claim 1, further comprising:
   sending a request to the first wireless network to indicate a preference to utilize the second wireless communication protocol for voice communications.

6. The method of claim 1, wherein the first wireless network operates in accordance with a long term evolution ("LTE") or long term evolution advanced ("LTE-A") wireless communication protocol, and the second wireless network operates in accordance with one of a legacy third generation ("3G") wireless communication protocol and a legacy second generation ("2G") wireless communication protocol.

7. The method of claim 1, further comprising:
   registering with the first wireless communication protocol for short message service ("SMS").

8. The method of claim 1, wherein the first wireless network is a packet-switched network and the second wireless network is a circuit switched network.

9. The method of claim 1, further comprising:
   receiving a further user request to enable the voice communications with the first wireless network;
   registering for voice communications with the first wireless network in accordance with the first wireless communication protocol;
   entering into an idle state;
   reconfiguring a plurality of internal stacks of the UE while in the idle state, wherein the reconfiguring includes indicating a first internal stack related to the second wireless communication protocol is a secondary stack and a second internal stack related to the first wireless communication protocol is a primary stack; and
   sending a further request to the first wireless network to indicate a preference to utilize the first wireless communication protocol for voice communications.

10. The method of claim 9, further comprising:
    maintaining a connection with the second wireless network to perform voice communications when there is a failure of the voice communications between the UE and the first wireless network.

11. A user equipment ("UE"), comprising:
a processor configured to control establishing and releasing connections between a wireless communication device and a first wireless network and between the wireless communication device and a second wireless network;
a transceiver configurable to transmit and receive signals to the first wireless network according to a first wireless communication protocol and to the second wireless network according to a second wireless communication protocol; and
a non-transitory memory having a program stored thereon, wherein the execution of the program causes the processor to perform operations comprising:
establishing a connection to the first wireless network in accordance with a first wireless communication protocol, wherein the first wireless communication protocol is used for voice communications and data communications between the UE and the first wireless network;
receiving a user request to disable the voice communications with the first wireless network;
transmitting, in response to the user request to disable the voice communications with the first wireless network, a request to deregister from an IP Multimedia Subsystem (IMS) before registering for voice communications with the second wireless network, wherein, as a result of the request to deregister, the UE switches an internal configuration and changes an IP address;
registering for voice communications with a second wireless network in accordance with a second wireless communication protocol; and
maintaining the connection to the first wireless network to continue data communications between the UE and the first wireless network, wherein the UE simultaneously operates in the first wireless communication protocol and the second wireless communication protocol.

12. The UE of claim 11, wherein the operations further comprise:
entering into an idle state; and
reconfiguring a plurality of internal stacks of the UE while in the idle state, wherein the reconfiguring includes indicating a first internal stack related to the second wireless communication protocol is a primary stack and a second internal stack related to the first wireless communication protocol is a secondary stack.

13. The UE of claim 11, wherein the first wireless communication protocol includes assigning an address to the UE and wherein the UE maintains the same address throughout the steps of the operations, wherein the address is an Internet Protocol (IP) address.

14. The UE of claim 11, wherein the operations further comprise:
sending a request to the first wireless network to indicate a preference to utilize the second wireless communication protocol for voice communications.

15. The UE of claim 11, wherein the first wireless network operates in accordance with a long term evolution ("LTE") or long term evolution advanced ("LTE-A") wireless communication protocol, and the second wireless network operates in accordance with one of a legacy third generation ("3G") wireless communication protocol and a legacy second generation ("2G") wireless communication protocol.

16. The UE of claim 11, wherein the first wireless network is a packet-switched network and the second wireless network is a circuit switched network.

17. A computer program product encoded as computer program code in a non-transitory computer readable medium for configuring wireless circuitry of a wireless communication device, the computer program product comprising instructions for:
establishing a connection to a first wireless network in accordance with a first wireless communication protocol, wherein the first wireless communication protocol is used for voice communications and data communications between a UE and the first wireless network;
receiving a user request to disable the voice communications with the first wireless network;
transmitting, in response to the user request to disable the voice communications with the first wireless network, a request to deregister from an IP Multimedia Subsystem (IMS) before registering for voice communications with the second wireless network, wherein, as a result of the request to deregister, the UE switches an internal configuration and changes an IP address;
registering for voice communications with a second wireless network in accordance with a second wireless communication protocol; and
maintaining the connection to the first wireless network to continue data communications between the UE and the first wireless network, wherein the UE simultaneously operates in the first wireless communication protocol and the second wireless communication protocol.

18. The computer program product of claim 17, further comprising instructions for:
entering into an idle state;
reconfiguring a plurality of internal stacks of the UE while in the idle state, wherein the reconfiguring includes indicating a first internal stack related to the second wireless communication protocol is a primary stack and a second internal stack related to the first wireless communication protocol is a secondary stack; and
sending a request to the first wireless network to indicate a preference to utilize the second wireless communication protocol for voice communications.

* * * * *